United States Patent [19]
Yamashita

[11] Patent Number: 4,943,143
[45] Date of Patent: Jul. 24, 1990

[54] DISPLAY PANEL
[75] Inventor: Seisuke Yamashita, Matsumoto, Japan
[73] Assignee: Fuji Electric Co., Ltd., Kawasaki, Japan
[21] Appl. No.: 192,540
[22] Filed: May 11, 1988
[30] Foreign Application Priority Data May 13, 1987 [JP] Japan .................. 61-116605
[51] Int. Cl.$^5$ ................................. G02F 1/13
[52] U.S. Cl. .................. 350/339 R; 350/333; 350/340
[58] Field of Search ............ 350/330, 333, 340, 341, 350/339 R

[56] References Cited
U.S. PATENT DOCUMENTS

| | | | |
|---|---|---|---|
| 4,385,292 | 5/1983 | Nonomura et al. | 350/333 X |
| 4,589,733 | 5/1986 | Yaniv et al. | 350/332 |
| 4,634,227 | 1/1987 | Nishimura et al. | 350/334 |
| 4,709,992 | 12/1987 | Ueno | 350/333 |
| 4,715,685 | 12/1987 | Yaniv et al. | 350/332 |
| 4,729,638 | 3/1988 | Shirai | 350/341 X |
| 4,738,513 | 4/1988 | Nishiura et al. | 350/333 |
| 4,770,501 | 9/1988 | Tamura et al. | 350/333 X |
| 4,802,024 | 4/1989 | Nishiura | 350/333 |

Primary Examiner—Stanley D. Miller
Assistant Examiner—Huy K. Mai
Attorney, Agent, or Firm—Brumbaugh, Graves, Donohue & Raymond

[57] ABSTRACT

A display panel comprises a substrate having disposed thereon a plurality of display elements, each display element comprising a pixel electrode disposed on the substrate; a scan electrode disposed on the substrate separate from the pixel electrode; two display drive elements, one disposed over a first part of the pixel electrode and the other disposed over a first part of the scan electrode; an insulating layer extending over at least a second part of the pixel electrode and the two display drive elements and having at least three openings formed therein, two of the openings being coincident with and exposing a portion of each of the display drive elements and a third opening being disposed so as to expose a portion of the second part of the pixel electrode; a first connecting layer disposed over the insulating layer and forming an electrical connection through the windows in the insulating layer between the exposed portion of the display drive element disposed over the scan electrode and the exposed portion of the pixel electrode; and a second connecting layer disposed over the insulating layer and forming an electrical connection between the portion of the display drive element disposed over the pixel electrode exposed through the opening in the insulating layer and an exposed part of the scan electrode.

26 Claims, 2 Drawing Sheets

DISPLAY PANEL

BACKGROUND OF THE INVENTION

The present invention relates to an image display panel such as a liquid crystal display panel of active matrix type. More particularly, it relates to an image display panel which is made up of a substrate having an array of display elements thereon; each display element comprising a pixel electrode to display picture elements and a scan electrode to apply a display voltage, and display drive elements connected to the pixel electrode and scan electrode.

Recently display panels, especially liquid crystal display panels, have come into practical use for the display of television images, although the size is still somewhat limited. For the display panel to display images as large as those of conventional CRTs, it must have a larger area and higher display density than before. A display panel of sufficiently large area and high display density requires several hundred pixels in each of the horizontal and vertical directions, which is equivalent to tens of thousands of pixels on the entire surface of the panel. If these pixels are to be driven by their corresponding external circuits, the drive circuits would be very complex and expensive. This disadvantage is eliminated in the case of an active matrix system. According to this system, each pixel is provided with a simple display drive element which has been previously built into the substrate of the display panel. The display drive element built into the substrate needs to be of thinfilm type. The known display drive elements include metalinsulator-metal (MIM) elements, thin-film transistors (TFT), and a pair of diodes connected in parallel with opposite polarities. The display drive element based on diode pairs made of amorphous silicon thin film is considered to be promising on account of its low cost and uniform switching characteristics.

No matter what type of display drive element might be used, the decided disadvantage of the display panels of large area and high display density is that their yields are low. A display panel has tens of thousands of pixels on a substrate, as mentioned above. This means that a display panel needs hundreds of thousands of display drive elements in total because each display drive element of diode pair type needs two diodes, and a color display panel needs three times as many display drive elements as a monochrome display panel. It is very difficult to produce all of these elements completely free of defects. Although the defects which are liable to occur in the display drive elements differ from one type to another, defects occur less frequently than expected in the amorphous silicon layer in the case where the display drive elements are amorphous silicon diode pairs. Rather, defects occur frequently in the connections of pixel electrodes and scan electrodes. These defects lead to the short-circuit of display drive elements and, more frequently, the disconnection of such elements. FIG. 3 illustrates how defects occur in the conventional display panel that employs diode pairs as the display drive elements.

FIG. 3(a) is an enlarged plan view showing a part of a display in which a diode pair 31, 32 for one pixel is provided. FIGS. 3(b) and 3(c) are sectional views taken in the direction of arrows B—B and C—C respectively, in FIG. 3(a). FIG. 3(a) shows pixel electrode 10 corresponding to diode 31 and 32, and an adjacent pixel electrode 11, as well as a scan electrode 20 to apply a display voltage to a plurality of pixel electrodes arranged in the vertical direction in the figure. The pixel electrodes and the scan electrode 20 are formed on the entire surface of a colorless transparent glass substrate 1 from a transparent conductive metal oxide layer such as indium-tin oxide (ITO) having a thickness of between hundreds and thousands of angstroms by electron-beam evaporation or sputtering. On the metal oxide layer are formed diodes 31, 32 in the following manner. A light-shielding layer 30a, which is a 500–2000 Å thick Cr layer is formed by sputtering. On the light-shielding layer 30a is grown an amorphous silicon layer 30b of pin structure to a thickness of 0.5 to 1 μm by plasma CVD method. On the amorphous silicon layer 30b is formed a Cr light-shielding layer 30c. The thus formed amorphous silicon layer of triple layer structure containing light-shielding layer undergoes reactive ion etching by photolithography method except those parts which become diodes 31, 32. Those parts which become diodes 31,32 remain unetched as shown in FIG. 3(a). The previously deposited ITO film undergoes chemical etching by photolithography to form the pixel electrode 10 and scan electrode 20 of desired pattern.

Then a 500–2000Å thick insulation layer 61 of silicon nitride as a protective film is formed by CVD method on the entire surface. This layer undergoes etching by photolithography to form a pattern which covers the two diodes 31, 32 as shown in FIG. 3(a). At the same time, a window 61a is formed in the insulation layer on the top of each diode. This patterning is accomplished by gas etching. The light-shielding layer 30c under the window 61a prevents the amorphous silicon layer 30b from being etched by a reactive gas. The diodes 31, 32 are connected by an aluminum layer according to the usual practice. An aluminum layer having a thickness of thousands of angstroms is formed by sputtering such that it comes into conductive contact with the light-shielding layer 30c as the upper electrode layer under the window 61a. The aluminum layer is etched by photolithography to form the connection layers 41, 42 having a pattern as shown in FIG. 3(a). The connection layer 41 connects the top electrode of the diode 31 formed on the drive electrode 20 to the pixel electrode 10, and the connection layer 42 connects the top electrode of the diode 32 formed on the pixel electrode 10 to the scan electrode 20. Thus the connection layers 41, 42 establish the two diodes 31, 32 connected in parallel with opposite polarities between the pixel electrode 10 and scan electrode 20.

The display panel of conventional type formed as described above often suffers from disconnection on the substrate. The disconnection is attributable to the loss of the ITO layer at locations indicated by hatching, P and Q, in FIG. 3. P is between the connection layer 41 and the pixel electrode 10, and Q is between the connection layer 42 and the scan electrode 20. This defect occurs when the aluminum connection layer is formed by selective etching. This etching is achieved with phosphoric acid or hydrofluoric acid. This etching solution should not corrode the metal oxide layer, such as an ITO layer. In reality, however, corrosion sometimes does occur. To prevent the propagation of corrosion to other parts of the pixel electrode and scan electrode, a protective layer is formed under the aluminum layer. This protective layer is a Cr layer or Ti layer, about 1000 Å thick, formed by sputtering. The aluminum layer, which is 5000–6000 Å thick, is formed on the protective layer. The unnecessary part of the aluminum layer is removed by etching with phosphoric acid or hydrofluoric acid, and the unnecessary part of the Cr layer of Ti layer remaining after etching is removed by etching with a mixed aqueous solution of ceric ammonium nitrate and perchloric acid. The protective layer greatly reduces the occurrence of disconnection. A disadvantage of using the protective layer is that two additional steps are required for the deposition and etching of the metal layer, leading to an increased production cost. It may be possible to use the Cr layer or Ti layer alone as the connection layer, eliminating the aluminum layer. This alternative, however, has another disadvantage; that is, comparatively brittle Cr or Ti under thermal stress easily breaks at the step (about 2 μm) between the diode and the pixel electrode or scan electrode as shown in FIGS. 3(b) and 3(c).

SUMMARY OF THE INVENTION

It is an object of the present invention to provide a active matrix display panel that is substantially free of defects caused by disconnection. According to the present invention, this object is achieved by expanding the size of the insulating layer over that known in the art and forming at least one additional window in the insulating layer through which a portion of the pixel layer is exposed. Thus, a display panel according to the invention comprises a substrate having disposed thereon a plurality of display elements, each display element comprising (a) a pixel electrode disposed on the substrate;
(b) a scan electrode disposed on the substrate separate from the pixel electrode;
(c) display drive elements, for example a pair of photodiodes, one disposed over a first part of the pixel electrode and the other disposed over a first part of the scan electrodes;
(d) an insulating layer extending over at least a second part of the pixel electrode and the display drive elements and having at least three openings formed therein, two of the openings being coincident with and exposing a portion of each of the display drive elements and a third opening being disposed so as to expose a portion of the second part of the pixel electrode;
(e) a first connection layer disposed over the insulating layer and forming an electrical connection through the windows in the insulating layer between the exposed portion of the display drive element disposed over the scan electrode and the exposed portion of the pixel electrode; and
(f) a second connecting layer disposed over the insulating layer and forming an electrical connection between the portion of the display drive element disposed over the pixel electrode exposed through the opening in the insulating layer and an exposed part of the scan electrode.

Advantageously, a fourth window can be formed in the insulating layer so as to expose a part of the scan electrode, and the second connection layer will make electrical contact with this part of the scan electrode.

The apparatus of the present invention as mentioned above produces the following effects: There is only a small possibility of disconnection occurring at the step even when a metal such as aluminum having a high ionization tendency is used for the connection layer. The metal oxide layer used as the pixel electrode and the like is not corroded at the time of etching. Thus, the probability that defects such as disconnection occur in the display drive elements is reduced by a great extent.

DESCRIPTION OF THE PREFERRED EMBODIMENTS

Figure 1A:
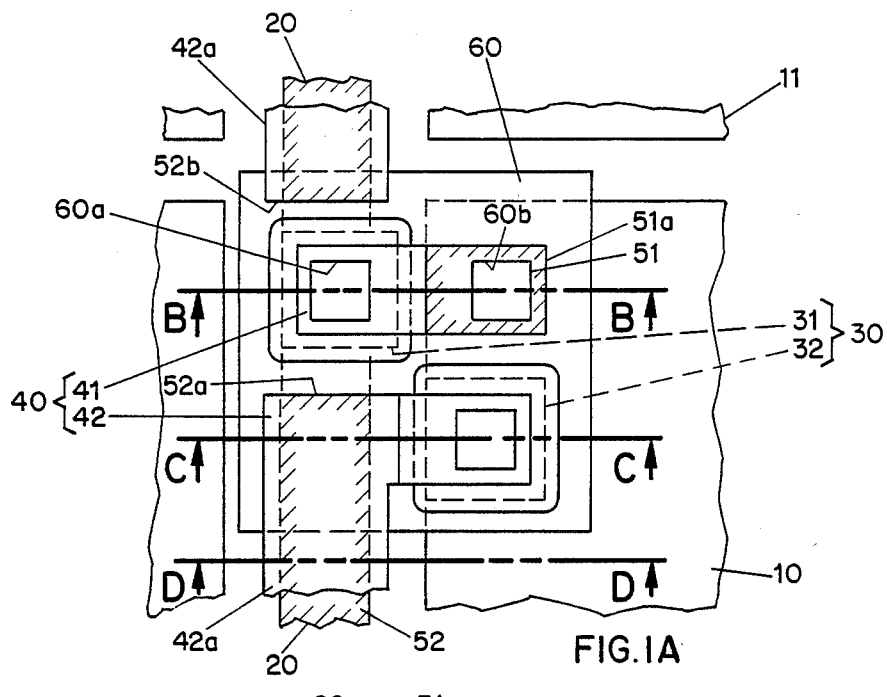
FIG. 1(a) is a partly enlarged plan view of an active matrix display panel according to the present invention.

The invention will be described in more detail with reference to the preferred embodiments illustrated in FIGS. 1 and 2. The reference characters used in FIG. 3 designate like or corresponding parts in FIGS. 1 and 2. The description for overlapping parts is omitted for brevity. In the examples the display panel is a liquid crystal display, and the display drive element is a pair of amorphous silicon diodes connected in parallel with opposite polarities, the pixel electrode and scan electrode are made of ITO film, the insulation layer is silicon nitride, and the metal for the connection layer is aluminum.

Figure 1B:
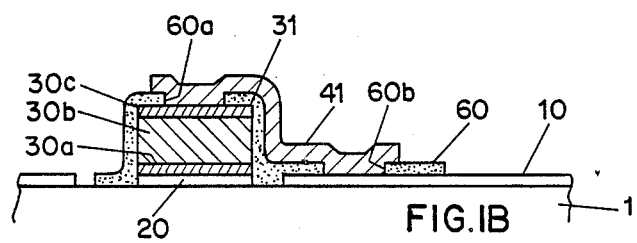
FIGS. 1(b), 1(c), and 1(d) are partly enlarged sectional views of the display panel of the invention.
Figure 1C:
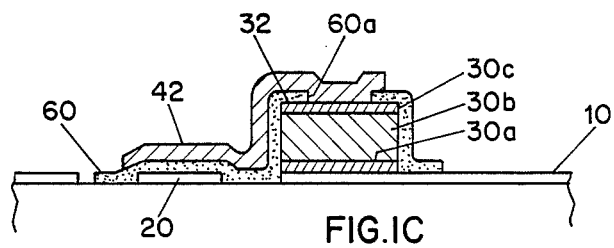
Figure 1D:
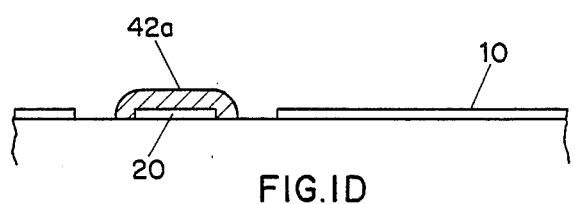

FIG. 1(a) is a plan view of a display element of a display panel in accordance with the invention. FIGS. 1(b), 1(c) and 1(d) are sectional views taken along lines B—B, C—C, and D—D, respectively, in FIG. 1(a). In accordance with the invention, insulation layer 60 has a larger area than that shown in FIG. 3, covering not only the two diodes 31, 32, but also a part of the pixel electrode 10 and the scan electrode 20. Additionally, the insulation layer may be square in shape. The insulation layer 60 is provided with two windows 60a at the center of the top of each of the diodes 31, 32, as in the case of the conventional product. Connection layer 41 for the diode 31 is connected through the window 60a to the light-shielding film 30a, which is the upper electrode of the diode 31. The connection layer 41 is in conductive contact with the pixel electrode 10 through another window 60b formed in the insulation layer 60. The overlapping area 51 of the connection layer 41 and pixel 10 is indicated by hatching in the figure. The C-shaped peripheral part 51a of the connection layer 41 is the part in which the conventional ITO film, as the pixel electrode 10, is subject to corrosion. According to this invention, the insulation layer 60 is inserted under the periphery 51a and its edge is preferably at least 10 μm away from the periphery 51a.

In FIG. 1 the connection layer 42 for the diode 32 has a shape different from connection layer 41. As shown, connection layer 42 is L-shaped and a part of the connection layer makes conductive contact with the scan electrode 20 at a location outside the lower periphery of the insulation layer 60. The connection layer 42 is disposed over the scan electrode 20 at the part 42a which is in conductive contact with the scan electrode 20, as shown in FIG. 1(d), and extends downward in the figure to the vicinity of the diode 31 for the pixel electrode. For convenience, the lower portion of the connection layer 42 of an adjacent display element is shown in the upper part of FIG. 1(a). The overlapping region 52 of the connection layer 42 and scan electrode 20 is indicated by hatching. The periphery of the connection layer 42 and the periphery of the overlapping region 52 is indicated by 52a, 52b. Under each of the peripheries 52a and 52b, there is the insulation layer 60 for the scan electrode 20. As mentioned above, the scan electrode 20 is mostly covered with the connection layer 42 so that the resistance of the scan electrode is reduced as much as possible and the scan electrode is protected from disconnection and other defects. This structure permits the considerable reduction of the width of the scan electrode 20.

Figure 2:
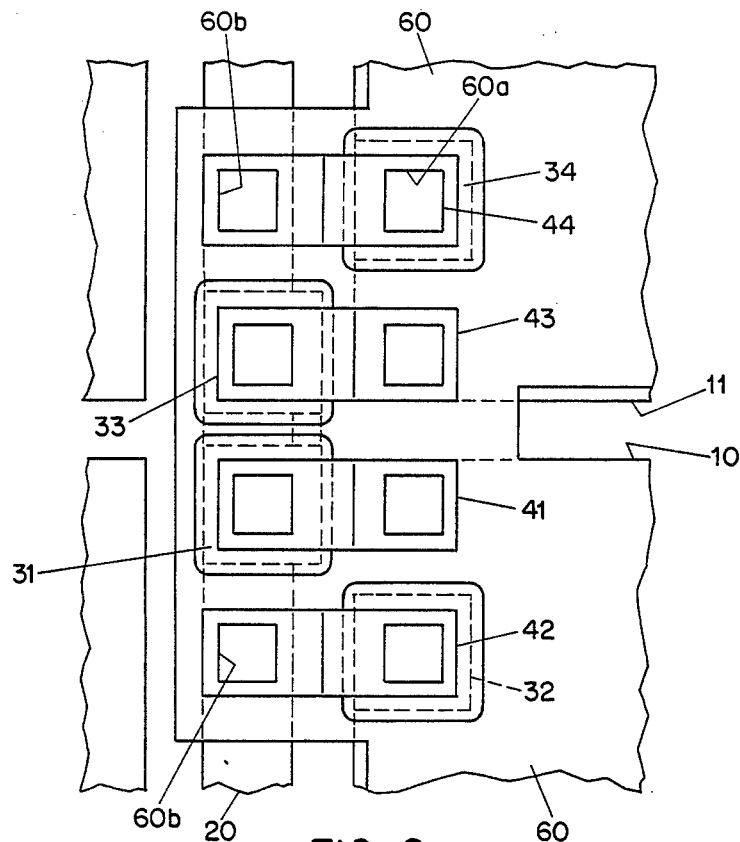
FIG. 2 is a partly enlarged plan view of a display panel in another embodiment of the invention.

Another embodiment of the invention is illustrated in FIG. 2. There are shown the diode pairs 31, 32 and 33, 34 for the adjacent two pixel electrodes 10, 11. These four diodes are arranged close to one another so that the area which they occupy is minimized. In this example, the insulation layer 60 is made of polyimide resin. It is used as a photoersist and can be thinner than 1000 Å on account of its superior mechanical strength. The insulation layer 60 serves as both a continuous insulation layer and an alignment layer for the pixel electrodes 10, 11. It is deposited and etched such that it entirely covers not only the four diodes but also the two pixel electrodes 10, 11. The window 60a is formed in the insulation layer 60 at the top of each diode. It is through this window that one end of the respective connection layers 41 to 44 is connected to the upper electrode of the diodes 31 to 34. The other end of the connection layer is conductively connected to the pixel electrodes 10, 11 and scan electrode 20 through the other window 60b formed in the insulation layer 60. That part of the insulation layer 60 on the pixel electrodes 10, 11 which is used as the alignment layer on which the diode or connection layer is not formed, undergoes rubbing after complete curing, so that the liquid crystal molecules in contact with the alignment layer are arranged in the specified direction.

The pixel electrodes are advantageously made of a metal oxide layer because they are required to be transparent and electrically conductive for image display. It is not always necessary for the scan electrodes to be made of a metal oxide layer. The display drive elements, e.g., the photodiodes, are connected via a connection layer to either a pixel electrode and the scan electrode. These connections are protected from etch-induced defects, however, by the incorporation of an insulation layer interposed between the connection layer and the electrode at the point where the connection layer comes into contact with the electrode. This region, where the insulation layer is interposed, is also referred to as the overlapping region, as it is the point at which the connection layer and the electrodes overlap for their mutual connection. The insulation layer is provided to cover the display elements, for example a pair of photodiodes, for their protection, and may be extended to or beyond the overlapping region to cover remaining portions of the electrodes, referred to as the periphery. Alternatively, the insulation layer may be formed separately for the periphery.

The metal oxide layer (such as ITO or tin oxide) used for the pixel electrode should not be easily corroded by an etching solution (such as phosphoric acid and hydrofluoric acid) for aluminum, or for a similar metal having a high ionization tendency conventionally used as the connection layer. This is confirmed by the fact that the metal oxide layer is not corroded when the aluminum layer on the flat part (central part) of the pixel electrode is removed by etching with the acid etching solution.

Figure 3A:
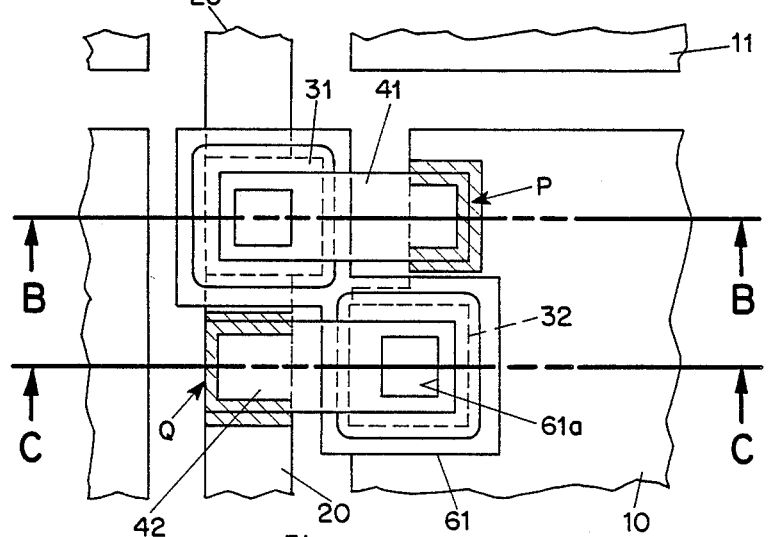
FIG. 3(a) is a partly enlarged plan view of the conventional display panel of active matrix type.
Figure 3B:
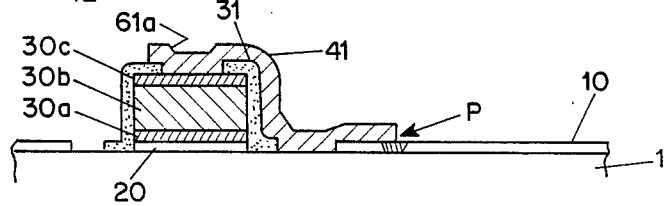
FIGS. 3(b) and 3(c) are partly enlarged sectional views of the conventional display panel of active matrix type.
Figure 3C:
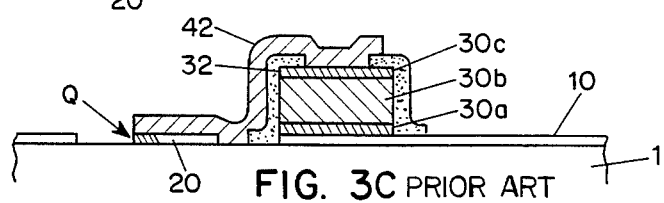

The condition of etching the parts P and Q shown in FIG. 3 is different from the condition of etching the flat aluminum layer in that the solid aluminum layer to be left unetched is in direct contact with the metal oxide layer. In other words, in the case of etching on the flat part, the aluminum layer on the metal oxide layer is removed by etching sequentially from its surface, and when etching finally reaches the surface of the metal oxide layer, there exists almost no solid aluminum on the surface of the metal oxide layer. By contrast, in the case of etching at P and Q, there exists solid aluminum even when etching reaches the surface of the metal oxide layer. This solid aluminum in combination with the electrically conductive metal oxide layer form a kind of cell by the acid of the etching solution, which is an electrolyte. As a result, corrosion of the metal oxide layer takes place. As the metal (such as aluminum having a high ionization tendency) for the connection layer is dissolved in the acid etching solution, hydrogen is evolved, and this hydrogen reduces the metal oxide, causing the metal component to be dissolved in the etching solution.

The present inventors completed this invention by paying attention to the above mentioned points. According to the present invention, the above-mentioned voltaic action is reduced to a great extent by interposing an insulation layer between the connection layer made of aluminum, or a similar metal having a high ionization tendency, and the metal oxide layer forming the pixel electrodes and the like. Even though the insulation layer is interposed, the metal of the connection layer is connected to the metal oxide layer of the electrode through the electrolytic etching solution which is in contact with the surface of the insulation layer. Therefore, theoretically, the possibility of voltaic action still exists. Nevertheless, the presence of the insulation layer weakens the voltaic action as compared with the conventional case, in which the metal is in direct contact with the metal oxide layer. The results of experiments indicate that the corrosion of the metal oxide layer can be substantially eliminated if a space of 10 to 20 $\mu$m (depending on the kind of etching solution used) is provided by the surface of the insulation layer.

In summary, the present invention provides an insulation layer interposed between the metal of the connection layer and the metal oxide layer of the pixel electrode or scan electrode. This structure prevents the metal oxide from corrosion by an etching solution. Without the insulation layer, corrosion takes place when the connection layer undergoes etching by photolithography on account of the strong voltaic action between the metal and the metal oxidelayer, which are in direct contact with each other. The construction in accordance with the invention, on the other hand, leads to a great decrease in the probability that defects by disconnection occur in display drive elements. The corrosion preventative effect is also produced in the case where a metal having a considerably high ionization tendency is used for the connection layer. Therefore, the present invention produces the following effects: Aluminum, which has been commonly used for connection, can be used alone for the connection layer. The connection layer for display drive elements has a high reliability. The coating and etching can be accomplished in one step each. According to the present invention, it is possible to simplify the process for producing the display panel of active matrix type and also to reduce the probability that defects occur in the display drive elements. The present invention is expected to contribute to the further development and commercialization of the display panel of large size and high display density.

I claim:

1. A display panel comprising a substrate having a plurality of display elements disposed thereon, each display element comprising:
   (a) a pixel electrode disposed on the substrate;
   (b) a scan electrode disposed on the substrate separate from the pixel electrode;
   (c) two display drive elements, one disposed over a first part of the pixel electrode and the other disposed over a first part of the scan electrode;
   (d) an insulating layer extending over the two display drive elements and over at least a second part of the pixel electrode and having at least three openings formed therein, two of the openings being coincident with and exposing a portion of each of the display drive elements and a third opening being disposed so as to expose a portion of the second part of the pixel electrode;
   (e) a first connecting layer disposed over the insulating layer, said first connecting layer formed by etching, and said first connecting layer forming an electrical connection through the openings in the insulating layer between the exposed portion of the display drive element disposed over the scan electrode and the exposed portion of the pixel electrode; and
   (f) a second connecting layer disposed over the insulating layer, said second connecting layer formed by etching, and said second connecting layer forming an electrical connection between the portion of the display drive element disposed over the pixel electrode exposed through the opening in the insulating layer and an exposed part of the scan electrode.

2. A display panel as claimed in claim 1, wherein the pixel electrode is a metal oxide layer.

3. A display panel as claimed in claim 1, wherein both the pixel electrode and scan electrode are metal oxide layers.

4. A display panel as claimed in claim 2 or 3, wherein the metal oxide layer is of indium-tin oxide.

5. A display panel as claimed in claim 1, wherein both the first connecting layer and the second connecting layer are formed from aluminum.

6. A display panel of as claimed in claim 1, wherein the insulating layer is formed from silicon nitride.

7. A display panel as claimed in claim 1, wherein the insulating layer is formed from polyimide.

8. A display panel as claimed in claim 7, wherein the polyimide insulating layer extends over the two display drive elements and the entire pixel electrode.

9. A display panel as claimed in claim 8, wherein the polyimide insulating layer serves as an alignment layer for a plurality of pixel electrodes disposed on the substrate.

10. A display panel as claimed in claim 1, wherein the display drive elements are a pair of photodiodes connected in parallel with opposite polarities.

11. A display panel as claimed in claim 10, wherein the scan electrode is made of a metal oxide layer, and the second connecting layer of each display element is shaped such that said second connecting layer overlaps with essentially all of the scan electrode between said display element and an adjacent display element.

12. A display panel as claimed in claim 1, wherein a fourth opening is formed in the insulating layer coincident with a portion of the scan electrode, and the second connecting layer makes electrical contact with the scan electrode through the fourth opening.

13. A display panel according to claim 1 or 12, wherein the first and second connecting layers overlap a portion of the insulting layer surrounding each of said opening, said overlap being at least 10 μm in width.

14. A method for producing a display panel comprising a substrate having a plurality of display elements disposed thereon, comprising the steps of:
   (a) forming a pixel electrode on the substrate;
   (b) forming a scan electrode on the substrate separate from the pixel electrode;
   (c) forming two display drive elements, one disposed over a first part of the pixel electrode and the other disposed over a first part of the scan electrode;
   (d) forming an insulating layer which extends over the two display drive elements and over at least a second part of the pixel electrode and having at least three openings formed therein, two of the openings being coincident with and exposing a portion of each of the display drive elements and a third opening being disposed so as to expose a portion of the second part of the pixel electrode;
   (e) forming a first connecting layer over the insulating layer by etching, such that said first connecting layer forms an electrical connection through the openings in the insulating layer between the exposed portion of the display drive element disposed over the scan electrode and the exposed portion of the pixel electrode; and
   (f) forming a second connecting layer over the insulating layer by etching, such that said second connecting layer forms an electrical connection between the portion of the display drive element disposed over the pixel electrode exposed through the opening in the insulating layer and an exposed part of the scan electrode.

15. The method of claim 14, wherein the pixel electrode is a metal oxide layer.

16. The method of claim 14, wherein both the pixel electrode and scan electrode are metal oxide layers.

17. The method of claim 15 or 16, wherein the metal oxide layer is of indium-tin oxide.

18. The method of claim 14, wherein both the first connecting layer and the second connecting layer are formed from aluminum.

19. The method of claim 14, wherein the insulating layer is formed from silicon nitride.

20. The method of claim 14, wherein the insulating layer is formed from polyimide.

21. The method of claim 20, wherein the polyimide insulating layer extends over the two display drive elements and the entire pixel electrode.

22. The method of claim 21, wherein the polyimide insulating layer serves as an alignment layer for a plurality of pixel electrodes disposed on the substrate.

23. The method of claim 14, wherein the display drive elements are a pair of photodiodes connected in parallel with opposite polarities.

24. The method of claim 23, wherein the scan electrode is made of metal oxide layer, and the second connecting layer of each display element is shaped such that it overlaps with essentially all of the scan electrode between said display element and an adjacent display element.

25. The method of claim 14, wherein a fourth opening is formed in the insulating layer coincident with a portion of the scan electrode, and the second connecting layer makes electrical contact with the scan electrode through the fourth opening.

26. The method of claims 14 or 25, wherein the first and second connecting layers overlap a portion of the insulating layer surrounding each of said openings, and overlap being at least 10 μm in width.

* * * * *